June 17, 1952     I. F. SCHRECK     2,601,171
POWER PROPELLED TRUCK OF THE TYPE PROVIDED WITH A STEERING
HANDLE CONNECTED TO A SWIVELED TRACTION WHEEL
Filed Feb. 14, 1947     3 Sheets-Sheet 3
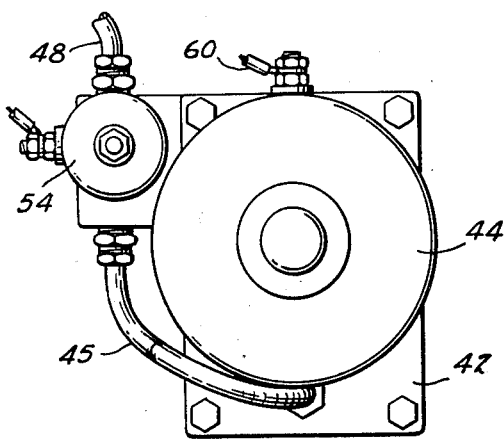
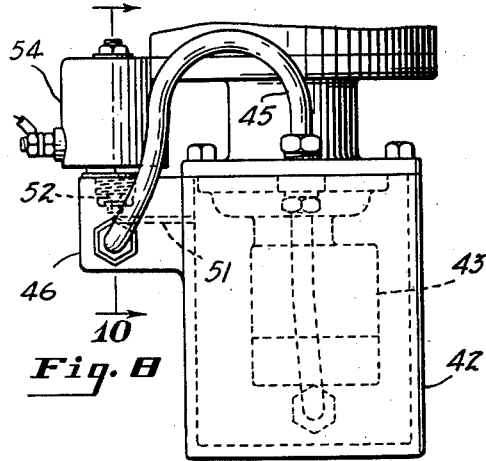
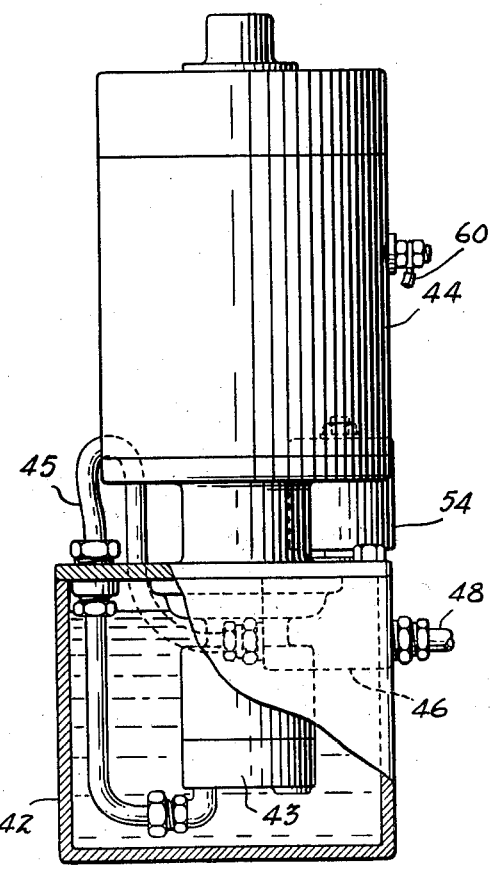
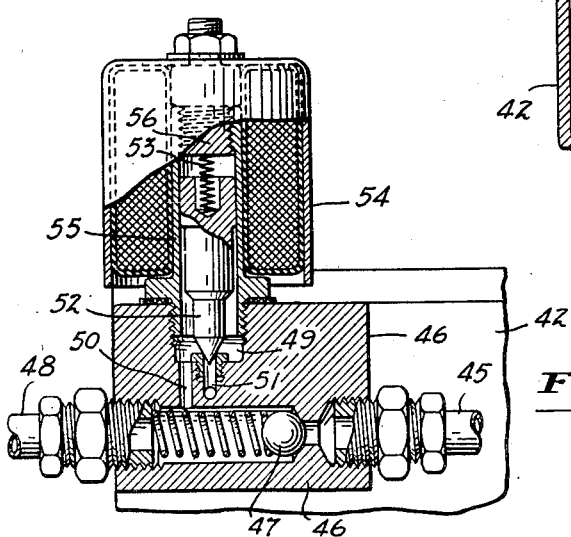
INVENTOR
*Irvin F. Schreck*
BY *Evans + McCoy*
ATTORNEYS Patented June 17, 1952

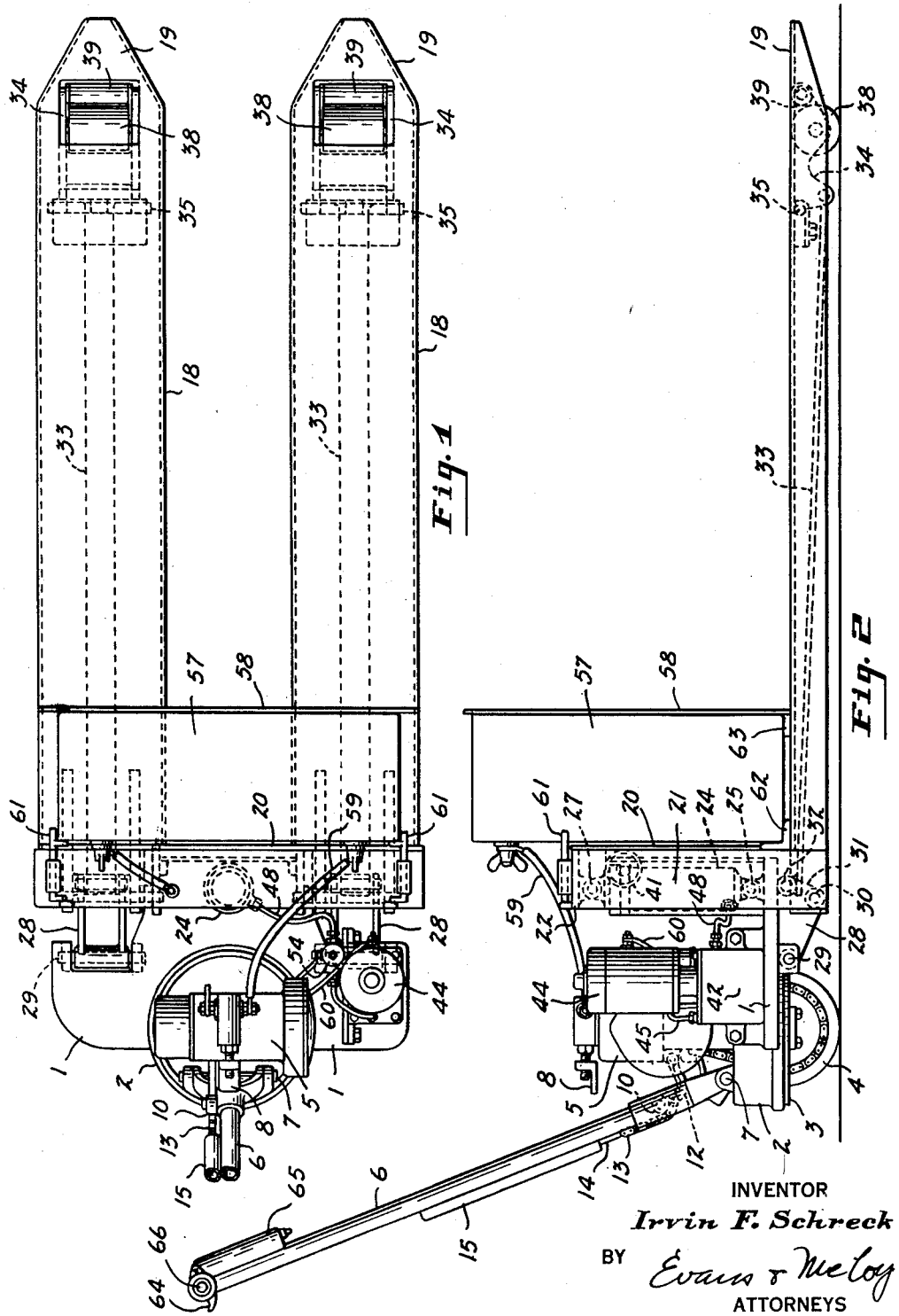

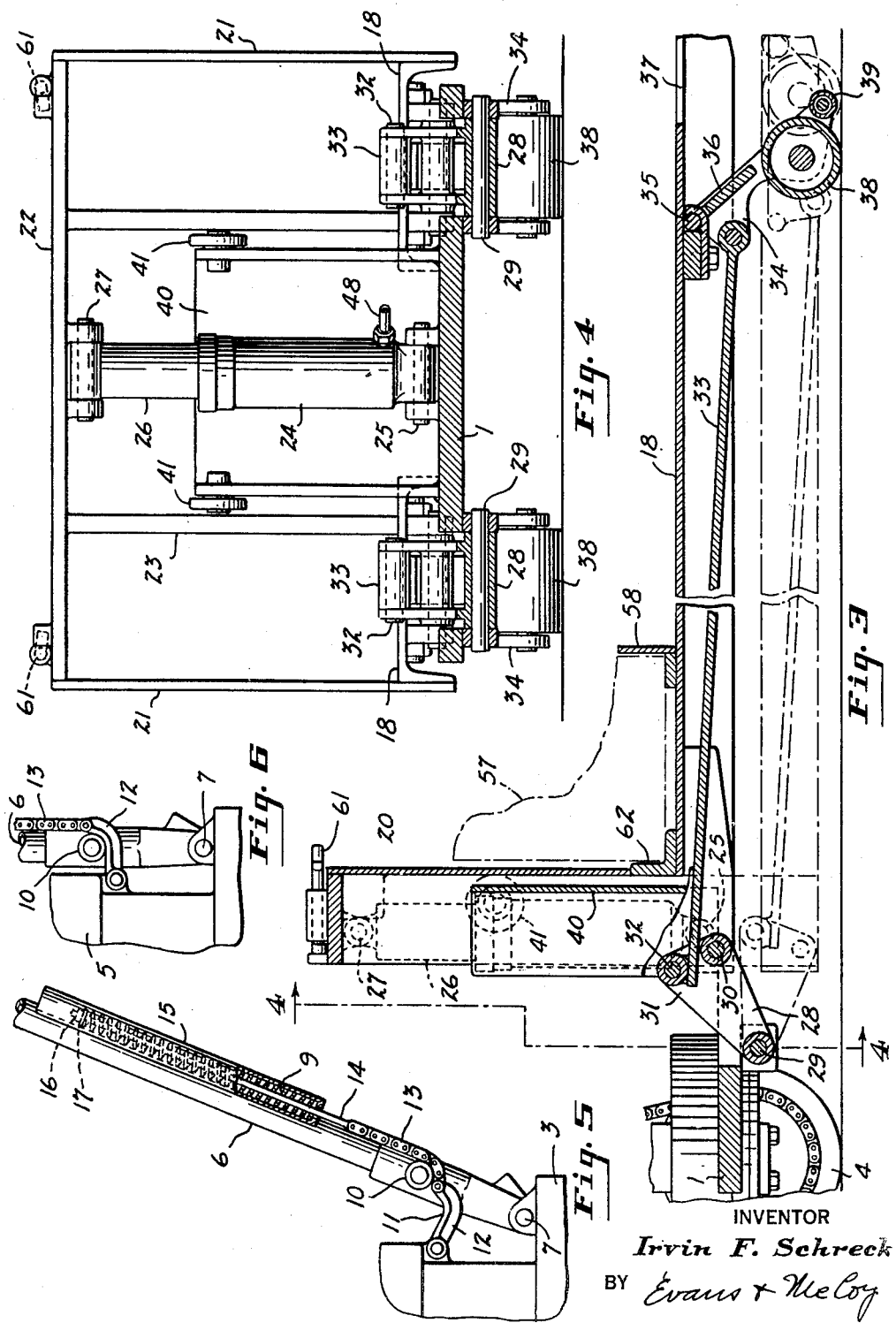

2,601,171

UNITED STATES PATENT OFFICE 2,601,171

POWER PROPELLED TRUCK OF THE TYPE PROVIDED WITH A STEERING HANDLE CONNECTED TO A SWIVELED TRACTION WHEEL

Irvin F. Schreck, Cleveland Heights, Ohio

Application February 14, 1947, Serial No. 728,550

1 Claim. (Cl. 280—47)

This invention relates to lift trucks, and more particularly to power propelled trucks of the type provided with a steering handle connected to a swiveled traction wheel and carrying propulsion control elements so that the truck may be steered and controlled by a walking operator.

The present invention has for an object to provide an electrically operated lift truck of the pallet type in which a load carrying unit is coupled to a tractor unit and in which the tractor unit has its traction and steering wheel and hoist mechanism compactly arranged closely adjacent the front end of the load carrying unit.

A further object of the invention is to provide a simple and inexpensive connection between the tractor and load carrying units by which the vertical movements of the load carrying frame are guided with a minimum of friction.

With the above and other objects in view, the invention may be said to comprise the truck as illustrated in the accompanying drawings, hereinafter described and particularly set forth in the appended claim, together with such variations and modifications thereof as will be apparent to one skilled in the art to which the invention pertains.

Reference should be had to the accompanying drawings forming a part of this specification, in which;

Figure 1 is a top plan view of a pallet truck embodying the invention;

Fig. 2 is a side elevation of the truck;

Fig. 3 is a longitudinal section through one of the pallet supporting arms of the load carrying unit;

Fig. 4 is a vertical transverse section taken on the line indicated at 4—4 in Fig. 3;

Fig. 5 is a fragmentary side elevation of the steering handle;

Fig. 6 is a fragmentary view showing the handle in vertical position;

Fig. 7 is a top plan view of the motor and liquid reservoir of the hydraulic hoist mechanism;

Fig. 8 is a side elevation of the reservoir and motor looking toward the inner side thereof;

Fig. 9 is a side elevation of the reservoir and motor looking toward the outer side, a portion of the reservoir wall being broken away to show the pump in section; and Fig. 10 is a section taken on the line indicated at 10—10 in Fig. 8.

Referring to the accompanying drawings, the tractor unit has a frame in the form of a platform 1 in which is mounted a horizontal bearing annulus 2 which projects beyond the forward edge of the platform 1. Within the bearing annulus 2 there is mounted a frame 3 that swivels about a vertical axis. The frame 3 has a supporting wheel 4 journaled therein, the wheel 4 being positioned within the annulus and supporting the platform 1 a short distance above the floor surface. The frame 3 carries an electric motor 5 which is geared to the wheel 4 to propel the truck.

A steering handle 6 is connected at its lower end to the frame 3 by a horizontal pivot 7 and is movable from a vertical position to various inclined positions convenient for an operator walking ahead of the truck. It is desirable that the motor be inoperative when the steering handle is in vertical position and this may be accomplished by means of a safety switch 8 mounted on the motor housing and engaged by the handle 6 when it is in its vertical position. The handle 6 is normally held in its vertical position by means of a counterbalancing spring 9 that is mounted on the handle, the handle being provided with a roller 10 that engages in the recessed top face 11 of a retaining link 12 that is pivoted to the frame 3 above the pivot 7 and which is actuated by the spring 9 to yieldably retain the handle in its uppermost position. The spring 9 is connected to a link 12 by means of a flexible cable, such as a chain 13, and a rod 14. The spring 9 is mounted in a cylindrical housing 15 attached to the handle 6 and the rod 14 extends through the spring and carries an adjustable nut 16 at its upper end which bears against a washer 17 against which the upper end of the spring 9 is seated. The tension of the spring 9 can be adjusted by adjusting the nut 16 and a thrust is exerted upon the roller 10 by the chain 13, tending to move the handle toward upright position. Whenever the handle is released by the operator the spring 9 swings the handle to vertical position, shifting the roller 10 into engagement with the recessed upper face 11 of the link 12 to releasably retain the handle 6 in vertical position in engagement with the safety switch 8 so that the motor cannot be operated with the handle in this position. The link 12 retains the handle against accidental displacement from its vertical position but it will yield to permit the handle to be swung to operating position by a pull on the upper end of the handle.

The load carrying unit comprises a pair of horizontal laterally spaced pallet engaging arms 18 which are in the form of downwardly facing channels provided with pointed ends 19 to facilitate their entry into the pallet openings. The arms 18 are connected at their rear ends by a standard 20 in the form of a transverse vertical plate which is provided with rearwardly extending side and top flanges 21 and 22 and with spaced vertical stiffening ribs 23 on the rear side thereof. The standard 20 is rigidly attached to the arms 18 and is positioned immediately in front of the front edge of the platform 1.

The load carrying unit is raised and lowered by means of a hydraulic hoist mounted on the tractor unit, lifting force being applied to the load carrying unit by means of a cylinder 24 connected by a horizontal pivot 25 to the platform 1 and a piston 26 connected by a horizontal pivot 27 to the top flange 22 of the standard 20.

A pair of levers 28 serve to connect opposite sides of the tractor unit to the load carrying unit, the levers 28 being connected at their front ends by alined horizontal pivots 29 to the under side of the platform 1 and at their rear ends by alined horizontal pivots 30 to the lower end of the standard 20. Each of the levers has an upwardly extending arm portion 31 which carries pivots 32 to which longitudinally extending links 33 are connected at their forward ends. The links 33 are positioned within the downwardly facing channels of the arms 18 of the load carrying unit and are connected at their forward ends to short arms 34, also mounted in the channels of the arms 18 by means of pivots 35.

The arms 34 are formed with web portions 36 and slots 37 formed in the arms 18 receive the tops of wheels 38 carried by the arms when the arms 34 are in their uppermost positions. Each wheel 38 is in the form of a roller of small diameter and each arm 34 also preferably carries a smaller auxiliary roller 39 which is positioned in advance of the roller 38 and normally out of engagement with the floor surface. The roller 39 serves to assist the roller 38 in passing over irregularities in a floor surface, as is more fully explained in my copending application Serial No. 667,131, filed May 3, 1946, now Patent No. 2,462,007, dated February 15, 1949.

When the cylinder 24 is operated to lift the forward end portion of the load carrying unit, the levers 28 are swung upwardly, imparting a forward movement to the links 33 which causes the arms 34 to swing downwardly from the position shown in Fig. 2 to the position shown in Fig. 3 to elevate the forward end of the load carrying unit.

In order to guide the vertical movement of the load carrying unit with respect to the tractor unit, a standard 40 is rigidly attached to the rear end of the platform 1 and this standard carries one or more guide rollers 41 which bear against the front face of the standard 20 rearwardly of the cylinder 24. The guide roller 41 turns about a horizontal axis and if a plurality of rollers are employed they are mounted in axial alinement so that the load carrying unit can fulcrum about the axis of the guide rollers during its vertical movements. By providing a single set of guide rollers against which the standard 20 is pressed by the hoist mechanism, the load carrying unit is guided with a minimum of friction since it is free to fulcrum upon the axis of the guide rollers during its vertical movements.

Since a downward thrust on the rear end of the tractor unit presses the roller 41 against the standard 20 and a downward thrust on the forward end of the load carrying unit presses the standard 20 against the roller 41, the roller 41 limits downward movements of the pivotally connected ends of the tractor and load carrying units. The roller 41, however, offers no resistance to upward movements of the pivotally connected ends of the tractor and load carrying units and permits the pivoted ends to be moved upwardly by depressing the handle 6 as in my Patent No. 2,359,493, granted October 3, 1944.

Liquid is supplied to the cylinder 24 from a suitable tank 42 mounted on the platform 1 and within the tank 42 there is a submerged pump 43 that is driven by an electric motor 44 on the top of the tank 42. The outlet of the pump 43 is connected by a pipe 45 to a fitting 46 attached to the exterior of the tank 42, the fitting 46 being provided with a check valve 47 which prevents return flow of liqiud to the tank, and being connected to the cylinder 24 through a pipe 48. When the pump is operated liquid is forced through the fitting 46 to the cylinder 24. When the motor 44 is stopped, the piston 26 will be retained in elevated position by the liquid trapped in the cylinder 24. The fitting 46 is provided with a chamber 49 which is provided with a passage 50 that establishes communication between the pipe 48 and the chamber 49. A passage 51 is also provided from the chamber 49 to the interior of the tank 42 and this passage is controlled by a valve 52 that is normally held in closed position by a spring 53. Whenever the valve 52 is opened in opposition to the spring 53, liquid is permitted to flow from the cylinder 24 back to the tank 42. The weight of the load carrying unit acting upon the liquid in the tank 24 will force the liqiud back into the tank 42 and the load carrying unit will be lowered when the valve 52 is opened. For operating the valve 52, a solenoid 54 is provided, the solenoid 54 being mounted upon the top of the fitting 46 upon the exterior of a brass tube 55 that is screwed into the fitting 46. The interior of the brass sleeve 55 is in communication with the chamber 49 and its upper end is closed by means of a steel plug 56. The solenoid 54 is controlled by a suitable switch and serves when energized to lift the valve 52 which is formed of steel and fits loosely within the brass sleeve 55.

In order to shorten the truck and to position the steering traction wheel closely adjacent the front end of the lifting unit, provision is made for supporting a battery 57 on the load carrying unit. The battery 57 is positioned between the standard 20 and a vertical plate 58 attached to the arms 18 rearwardly of the standard 20, the battery 57 being connected by leads 59 and 60 to the motors 5 and 44. The battery 57 is adapted to be inserted or removed by sliding the same laterally between the standard 20 and the plate 58 and is retained in operative position by means of suitable latches 61. To facilitate the sliding of the battery, transverse supporting bars 62 and 63 are provided upon the tops of the arms 18 adjacent the standard 20 and plate 58.

The motor 5 is preferably controlled by means of a rotatable sleeve 64 at the upper end of the handle 6, which operates a suitable control switch mounted in the housing 65.

The motor 44 and solenoid 54 are preferably controlled by push button switches 66 mounted in the opposite ends of the hand grip portion of the handle 6.

It is to be understood that variations and modifications of the specific devices herein shown and described for purposes of illustration, may be made without departing from the spirit of the invention.

What I claim is:

A truck comprising a frame having a horizontal annular bearing portion, a wheel carrying frame swiveled in said bearing portion, a steering handle pivotally connected at its lower end to said wheel frame to swing vertically, a rod parallel with the handle and mounted for endwise movement on the under side of the handle, a spring resisting movement of said rod toward the handle pivot, means for adjusting the tension of said spring, a roller mounted on one side of said handle below the lower end of said rod, and a flexible connector attached at one end to the lower end of said rod and its other end to said wheel frame above the pivotal connection of the handle, said connector extending over said roller and exerting an upward thrust thereon and including a link attached to the wheel frame and provided with a retaining recess on its upper side to receive said roller when the said handle is in its uppermost position.

IRVIN F. SCHRECK.

REFERENCES CITED

The following references are of record in the file of this patent:

UNITED STATES PATENTS

| Number | Name | Date |
|---|---|---|
| 2,325,396 | Hastings | July 27, 1943 |
| 2,355,328 | Quayle | Aug. 8, 1944 |
| 2,359,493 | Schreck | Oct. 3, 1944 |
| 2,417,018 | Schroeder | Mar. 4, 1947 |